United States Patent
Katsuta et al.

(10) Patent No.: US 10,106,655 B2
(45) Date of Patent: Oct. 23, 2018

(54) POLYPHENYLENE SULFIDE FIBER

(71) Applicant: Toray Industries, Inc., Tokyo (JP)

(72) Inventors: Hiroo Katsuta, Shizuoka (JP); Reo Mitsunaga, Ehime (JP); Daisuke Yamamoto, Aichi (JP); Shunsuke Horiuchi, Aichi (JP); Yoshitsugu Funatsu, Shizuoka (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/515,519

(22) PCT Filed: Sep. 24, 2015

(86) PCT No.: PCT/JP2015/076911
§ 371 (c)(1),
(2) Date: Mar. 29, 2017

(87) PCT Pub. No.: WO2016/052295
PCT Pub. Date: Apr. 7, 2016

(65) Prior Publication Data
US 2017/0226292 A1 Aug. 10, 2017

(30) Foreign Application Priority Data

Sep. 30, 2014 (JP) .................. 2014-201595

(51) Int. Cl.
| | |
|---|---|
| C08G 75/00 | (2006.01) |
| C08G 75/16 | (2006.01) |
| C08K 5/375 | (2006.01) |
| C08L 23/32 | (2006.01) |
| D01D 5/12 | (2006.01) |
| D01F 6/76 | (2006.01) |
| B01D 39/08 | (2006.01) |
| C08G 75/02 | (2016.01) |

(52) U.S. Cl.
CPC ............ *C08G 75/16* (2013.01); *B01D 39/083* (2013.01); *C08G 75/02* (2013.01); *C08K 5/375* (2013.01); *C08L 23/32* (2013.01); *D01D 5/12* (2013.01); *D01F 6/765* (2013.01); *B01D 2239/0618* (2013.01)

(58) Field of Classification Search
CPC .. C08G 75/14; C08G 75/025; C08G 75/0281; C08F 6/28
See application file for complete search history.

(56) References Cited

U.S. PATENT DOCUMENTS

| | | |
|---|---|---|
| 5,215,819 A | 6/1993 | Anderheggen et al. |
| 8,263,204 B2 | 9/2012 | Higashinaka et al. |
| 8,652,977 B2 | 2/2014 | Shimizu et al. |
| 9,365,954 B2 | 6/2016 | Sugimoto et al. |
| 2014/0187115 A1 | 7/2014 | Nakano et al. |

FOREIGN PATENT DOCUMENTS

| | | | |
|---|---|---|---|
| JP | 6-256534 A | 9/1994 | |
| JP | 2008-202164 A | 9/2008 | |
| JP | 2008-266869 A | 11/2008 | |
| JP | 2009-228152 A | 10/2009 | |
| JP | 4852104 B2 | 1/2012 | |
| JP | 2012-31532 A | 2/2012 | |
| JP | 5139998 B2 | 2/2013 | |
| JP | 2013-72148 A | 4/2013 | |
| JP | 2013-249553 | 12/2013 | |
| JP | 2014-231650 | * 12/2014 | ............... D01F 6/00 |
| WO | 2012/165608 A1 | 12/2012 | |
| WO | 2013/125514 A1 | 8/2013 | |

OTHER PUBLICATIONS

Supplementary European Search Report dated Apr. 3, 2018, of corresponding European Application No. 15847414.8.

* cited by examiner

*Primary Examiner* — Shane Fang
(74) *Attorney, Agent, or Firm* — DLA Piper LLP (US)

(57) ABSTRACT

A poly(phenylene sulfide) fiber changes little in fiber structure and has excellent long-term heat resistance. Namely, the poly(phenylene sulfide) fiber has a degree of crystallization of 45.0% or higher, a content of movable amorphous components of 15.0% or less, and a weight-average molecular weight of 300,000 or less.

4 Claims, No Drawings

POLYPHENYLENE SULFIDE FIBER

TECHNICAL FIELD

This disclosure relates to a poly(phenylene sulfide) fiber that changes little in fiber structure and has excellent long-term heat resistance.

BACKGROUND

Poly(phenylene sulfide) (hereinafter often abbreviated to "PPS") fibers have high heat resistance, chemical resistance, electrical insulating properties, and flame retardancy and hence, have come to be used in industrial material applications including various filters, electrical insulators, and papermaking canvases. In particular, PPS fibers are extensively used in filter cloths for use in various industrial filters, e.g., bag filters for dust collection from discharge gases.

In use as bag filters, the discharge gases from incineration facilities have high temperatures and the filter cloths are used over a span of several years as a life. Namely, in industrial material applications such as filter cloths for bag filters, excellent long-term heat resistance is important, and changing little in fiber structure and decreasing little in strength at high temperatures of 150-210° C. are important properties.

It is generally known that an improvement in the degree of crystallization is effective in inhibiting the strength from decreasing at high temperatures and in improving dimensional stability, and various methods of heightening the degree of crystallization have been proposed. Examples thereof include a method in which a heightened spinning speed is used to enhance stretching in the spinning part, thereby controlling the degree of crystallization to be in a specific range (Japanese Patent No. 4852104) and a method in which a heat treatment is conducted at a temperature of 120-280° C. for a period of several seconds to several minutes to thereby improve the degree of crystallization (Japanese Patent No. 5139998 and JP 2013-72148 A). However, the fibers obtained by either of these methods cannot have a sufficiently high degree of crystallization, and the stability of the fiber structure thereof is insufficient.

Examples of techniques of obtaining PPS fibers having a high degree of crystallization include a method in which a blend of PPS with another thermoplastic resin is spun to obtain a composite fiber, this composite fiber is then stretched and heat-treated, and the other thermoplastic resin is thereafter dissolved away to obtain a nanofiber (WO 2013/125514). When this method is used, there is a possibility that the degree of crystallization can be heightened, but it is difficult to diminish movable amorphous components, which serve to perform molecular motion. The fiber obtained hence has insufficient structural stability. Furthermore, not only is the fiber usable in limited applications since the fiber is a nanofiber, but also the step of dissolving away the other thermoplastic resin is necessary.

Meanwhile, a PPS fiber which has a narrow molecular-weight distribution and a low content of metallic impurities and is hence excellent in terms of suitability for fiber formation and fiber property has been disclosed (JP 2008-202164 A). However, there is no mention therein of any technique for enhancing the high-temperature stability of the fiber structure in using the PPS fiber and thereby inhibiting the strength from decreasing.

It could therefore be helpful to provide a PPS fiber which, when used at high temperatures, changes little in fiber structure such as the degree of crystallization, and decreases little in strength and, hence, has excellent long-term heat resistance and is suitable for use as bag filters.

SUMMARY

We found that a PPS fiber having a degree of crystallization of 45.0% or higher, a content of movable amorphous components of 15.0% or less, and a weight-average molecular weight of 300,000 or less changes little in fiber structure and decreases little in strength.

We provide a poly(phenylene sulfide) fiber having a degree of crystallization of 45.0% or higher, a content of movable amorphous components of 15.0% or less, and a weight-average molecular weight of 300,000 or less.

We also provide the poly(phenylene sulfide) fiber having a degree of crystallization of 45.0% or higher, a content of movable amorphous components of 15.0% or less, and a weight-average molecular weight of 300,000 or less, having a fiber diameter of 5.0 μm or larger.

We further provide the poly(phenylene sulfide) fiber having a degree of crystallization of 45.0% or higher, a content of movable amorphous components of 15.0% or less, and a weight-average molecular weight of 300,000 or less, and a fiber diameter of 5.0 μm or larger, having a boiling-water shrinkage ratio at 98° C. of 1.0% or less.

It is possible to obtain a PPS fiber that changes little in fiber structure at high temperatures and decreases little in strength and, hence, has excellent long-term heat resistance and is suitable for use as bag filters.

DETAILED DESCRIPTION

Our fibers and methods are explained below in detail.

The PPS is a polymer including phenylene sulfide units such as p-phenylene sulfide units represented by structural formula (1), and m-phenylene sulfide units as the main repeating units. From the standpoint of heat resistance, the PPS preferably is a polymer which includes the repeating units represented by structural formula (1) in an amount of 70 mol % or larger, desirably 90 mol % or larger.

(1)

It is preferable that the PPS fiber has a higher purity than conventional ones. The content of alkali metals as impurities therein is preferably 50 ppm or less, more preferably 30 ppm or less, even more preferably 10 ppm or less. When the content of alkali metals exceeds 50 ppm, there is a heightened possibility that the melt spinnability might decrease or this PPS fiber might decrease, for example, in reliability in applications where a high degree of electrical insulating properties are required, resulting in limitations on applications of the PPS fiber. The alkali metal content of the PPS is a value calculated from the amount of alkali metals contained in ash matter which is a residue obtained by burning the PPS using, for example, an electric furnace, and that value can be determined by analyzing the ash matter, for example, by ion chromatography or an atomic absorption method.

The term "alkali metals" means lithium, sodium, potassium, rubidium, cesium, and francium, which are Group IA elements of the periodic table. Among various metal species, the alkali metals tend to highly affect the thermal properties of the PPS as compared with other metal species such as alkaline earth metals and transition metals. It is hence presumed that the PPS fiber can be made less apt to increase in weight-average molecular weight at high temperatures by regulating the content of, in particular, alkali metals among various metal species to be within that range. Furthermore, since alkali metal sulfides and the like represented by sodium sulfide are most commonly used in polymerization for PPS production, it is presumed that the heat resistance of the PPS fiber can be improved by regulating the content of sodium, among the alkali metals to be within that range. The alkali metal content of the PPS is a value calculated from the amount of alkali metals contained in ash matter which is a residue obtained by burning the PPS using, for example, an electric furnace, and that value can be determined by analyzing the ash matter, for example, by ion chromatography or an atomic absorption method.

It is preferable that the PPS fiber contains substantially no halogens other than chlorine, namely, contains substantially none of fluorine, bromine, iodine, and astatine. When the PPS contains a small amount of chlorine as a halogen, this chlorine only slightly affects the mechanical properties of the PPS because the chlorine is stable in the temperature range where the PPS is usually used. However, when halogens other than chlorine are contained, peculiar properties of these halogens tend to impair properties of the PPS, e.g., electrical properties and stagnation stability. When the PPS contains halogens other than chlorine, the content thereof is preferably 1% by weight or less, more preferably 0.5% by weight or less, even more preferably 0.2% by weight or less. When the content thereof is within that range, the electrical properties and the stagnation stability tend to be more satisfactory.

The fiber diameter of the PPS fiber is preferably 1.0 µm or larger, more preferably 5.0 µm or larger, even more preferably 10.0 µm or larger. By regulating the fiber diameter to 1.0 µm or larger, processing into bag filters or the like is rendered easy. Meanwhile, an upper limit of the fiber diameter is preferably 50.0 µm or less, more preferably 20.0 µm or less, even more preferably 16.0 µm or less. By regulating the fiber diameter to 50.0 µm or less, the fiber is rendered flexible.

The single-fiber fineness of the PPS fiber is preferably 27.0 dtex or less, more preferably 20.0 dtex or less, even more preferably 5.0 dtex or less, especially preferably 3.0 dtex or less. By regulating the single-fiber fineness thereof to 27.0 dtex or less, the fiber is rendered flexible. Meanwhile, when the single-fiber fineness thereof is too low, this fiber is difficult to handle and has considerably reduced suitability for high-order processing. Consequently, a lower limit of the single-fiber fineness thereof is preferably 0.2 dtex or higher, more preferably 0.5 dtex or higher.

The elongation of the PPS fiber is preferably less than 50.0%, more preferably 40.0% or less. The lower the elongation, the higher the degree in which the molecular chains have been oriented in the fiber axis direction. Lower elongations are suitable for heightening the degree of crystallization to reduce the change in fiber structure. A lower limit of the elongation thereof is preferably 5.0% or higher, from the standpoint of ensuring satisfactory handleability and processability.

The strength of the PPS fiber is preferably 1.0 cN/dtex or higher, more preferably 2.0 cN/dtex or higher. The higher the strength, the less the fiber is apt to break due to external force during use and the more the fiber is usable, for example, under high tension. Higher strengths thereof are hence preferred. Although there is no particular upper limit on the strength thereof, an upper limit thereof attainable is about 20.0 cN/dtex.

The elastic modulus of the PPS fiber is preferably 20.0-90.0 cN/dtex. By regulating the elastic modules thereof to be within that range, the fiber is rendered suitable for high-order processing and durable in practical use.

The boiling-water shrinkage ratio at 98° C. of the PPS fiber is preferably 1.0% or less, more preferably 0.5% or less, even more preferably 0.3% or less. When the boiling-water shrinkage ratio at 98° C. thereof is 1.0% or less, this fiber can change little dimensionally upon exposure to high temperatures and the property changes accompanying the dimensional change can also be reduced. Although there is no particular lower limit on the boiling-water shrinkage ratio at 98° C., a lower limit thereof attainable is about 0.0%.

The molecular weight of the PPS fiber, in terms of weight-average molecular weight, is 300,000 or less, preferably 150,000 or less, more preferably 100,000 or less, even more preferably 70,000 or less. Since the weight-average molecular weight thereof is 300,000 or less, this PPS increases little in molecular weight and, hence, decreases little in strength even when used at a high temperature over a long period. In general, an upper limit of the weight-average molecular weight of uncrosslinked linear PPS has been about 100,000. Consequently, when PPS has a weight-average molecular weight higher than 300,000, it is thought that the linear polymer as such has not increased in molecular weight and that the increased molecular weight is due to formation of high-molecular-weight components by a side reaction such as crosslinking. It is thought that when polymer chains have been crosslinked by such a side reaction, the crosslinks serve as defects, leading to embrittlement to result in a decrease in strength. The term "weight-average molecular weight" means a value determined by the method which will be described in Examples.

The degree of crystallization of the PPS fiber is 45.0% or higher, preferably 48.0% or higher. Since the degree of crystallization thereof is 45.0% or higher, the increase in the degree of crystallization at high temperatures can be made small and the PPS fiber can be inhibited from decreasing in strength. We gave a long-term heat treatment to PPS fibers and analyzed the resultant fiber structures. As a result, we found that crystallization proceeds continuously up to a degree of crystallization of 45.0% and that so long as the degree of crystallization is 45.0% or higher, substantially no increase in the degree of crystallization occurs any more. Namely, by regulating the degree of crystallization to 45.0% or higher, the change in the degree of crystallization at high temperatures can be made small and a stable fiber structure can be maintained. An attainable upper limit of the degree of crystallization is about 60.0%. The term "degree of crystallization" means a value determined by the method which will be described in Examples.

The melting point of the PPS fiber is preferably 270.0-295.0° C., more preferably 275.0-285.0° C. When the melting point thereof is 270.0-295.0° C., the crystal size is not excessively large and the structure is even. A high strength can be hence obtained. In PPS fibers having a degree of crystallization heightened by using an increased spinning speed, these fibers have melting points exceeding 295.0° C. because of the formation of large crystals. In this case, the fiber structures are uneven.

The content of movable amorphous components of the PPS fiber is 15.0% or less, preferably 10.0% or less, more preferably 9.5% or less. Since the content of movable amorphous components thereof is 15.0% or less, the increase in the degree of crystallization at high temperatures can be made small and the strength can be inhibited from decreasing. We subjected PPS fibers to a heat treatment preformed over a far longer period than conventional heat treatments, and analyzed the resultant fiber structures. As a result, we found that in the PPS fibers each having a content of movable amorphous components higher than 15.0%, the contents of movable amorphous components decrease continuously to increase the degree of crystallization, whereas so long as the content of movable amorphous components is 15% or less, substantially no change in the content thereof occurs any more. Namely, by reducing the content of movable amorphous components to 15.0% or less, the increase in the degree of crystallization can be made small and the strength can be inhibited from decreasing. An attainable lower limit of the content of movable amorphous components is about 3.0%. The term "content of movable amorphous components" means a value determined by the method which will be described in Examples.

An important feature is to heighten the degree of crystallization to 45.0% or higher and reduce the content of movable amorphous components to 15.0% or less and to simultaneously regulate the weight-average molecular weight to 300,000 or less.

It has been known that heightening the degree of crystallization is effective in inhibiting the fiber structure from changing at high temperatures. However, we analyzed PPS fibers for fiber structure in long-term heat treatments and, as a result, we found that when a high-temperature long-term heat treatment is conducted to heighten the degree of crystallization, the molecular weight increases considerably probably because of crosslinking due to a side reaction. In such cases, a decrease in strength also occurs. This strength decrease is presumed to be due to the crosslinks, which serve as defects. Consequently, by inhibiting the molecular weight from increasing and heightening the degree of crystallization, a PPS fiber which has high heat resistance and which, even at high temperatures of 150-210° C., increases little in the degree of crystallization and decreases little in strength is obtained.

As a method of obtaining such a fiber, use may be made, for example, of a method in which a long-term heat treatment is conducted in a temperature range where crystallization proceeds but side reactions do not proceed. However, the fiber can be efficiently obtained by the production process which will be described later.

The PPS fiber not only has a stable fiber structure and excellent long-term heat resistance but also has chemical resistance, mechanical properties, electrical insulating properties, and flame retardancy. This PPS fiber is suitable for use in various applications to take advantage of these features, the applications including filter applications such as bag filters, filters for liquid chemicals, filters for foods, chemical filters, oil filters, engine oil filters, and air-cleaning filters, paper applications such as electrically insulating paper, heat-resistant working wear applications such as firefighting garments, and other applications including safety garments, working wear for experiments, heat insulating garments, flame-retardant garments, felts for papermaking, sewing yarns, heat-resistant felts, release materials, dryer canvases for papermaking, separators for cells, separators for electrodes, heart patches, artificial blood vessels, artificial skins, substrates for printed wiring boards, copy rolling cleaners, ion-exchange bases, oil-holding materials, heat insulators, cushioning materials, brushes, net conveyors, motor binding threads, and motor binder tapes. In particular, the PPS fiber can be advantageously used as bag filters. However, applications of the PPS fiber are not limited to these examples.

A process for producing the PPS fiber is explained next in detail.

Examples of methods of producing a PPS polymer include a method in which a cyclic PPS compound is heated and melted to obtain a PPS polymer, as described in JP-A-2008-202164. Since this PPS polymer has a low alkali metal content, use of this PPS polymer is effective in inhibiting side reactions such as crosslinking from occurring during heat treatments.

It is preferable that the PPS polymer is dried before being subjected to melt spinning, from the standpoints of inhibiting foaming due to water inclusion to thereby enhance suitability for fiber formation. It is more preferred to conduct vacuum drying, because the low-boiling-point monomers remaining in the PPS polymer can also be removed to thereby further heighten the suitability for fiber formation. With respect to drying conditions, vacuum drying is usually performed at 100-200° C. for 8-24 hours.

A known melt spinning technique using a spinning machine of the pressure melter type, single- or twin-screw extruder type, or the like can be applied to the melt spinning. The polymer extruded is passed through a pipeline, metered with a known metering device, e.g., a gear pump, passed through a filter for foreign-matter removal, and then led to a spinneret. In this operation, the temperature of the parts ranging from the polymer pipeline to the spinneret (spinning temperature) is preferably regulated to or above the melting point of the PPS to enhance the flowability, and is more preferably not lower than (melting point of the PPS)+10° C. However, too high spinning temperatures lead to thermal deterioration of the PPS, resulting in the evolution of decomposition gases and impaired suitability for fiber formation. The spinning temperature hence is preferably regulated to 400° C. or lower, more preferably 380° C. or lower. It is possible to independently regulate the temperatures of the parts ranging from the polymer pipeline to the spinneret. In this case, ejection is stabilized by regulating the temperature of a portion near the spinneret to be higher than the temperature of the portion(s) located upstream therefrom.

The spinneret to be used for the ejection preferably is one in which the spinneret holes have a hole diameter D of 0.10-0.40 mm and an L/D, which is defined as the quotient obtained by dividing the land length L of the spinneret holes (length of each straight portion having the same diameter as the spinneret hole) by the hole diameter, of 1.0-4.0. The number of holes per spinneret is preferably 20 or larger from the standpoint of production efficiency.

The filaments ejected through the spinneret holes are cooled with a gas or liquid and solidified. As the gas, use can be made of any desired gas such as air or a mixed gas including nitrogen, oxygen, and water vapor. However, air is preferred from the standpoint of handleability. The temperature of the cooling gas may be determined in view of a balance between the temperature thereof and cooling wind velocity, from the standpoint of cooling efficiency. However, the temperature of the cooling gas is preferably 50° C. or lower from the standpoint of evenness in fineness. The cooling gas is caused to flow approximately perpendicularly to the filaments to thereby cool the filaments. In this case, the velocity of the cooling wind is preferably 5 m/min or higher from the standpoints of cooling efficiency and evenness in fineness, and is preferably 50 m/min or less from the standpoint of stable fiber formation. It is also preferable that the cooling for solidification is initiated in a position located at a distance of 20 mm to 500 mm from the spinneret. When the cooling is initiated at a distance less than 20 mm, the spinneret surface temperature may decline and the ejection becomes unstable. When the cooling is not initiated within 500 mm, the stability of refinement behavior may not be maintained and stable spinning is impossible. Meanwhile, as the liquid, use can be made of any desired liquid such as water, an alcohol, or an organic solvent. However, water is preferred from the standpoint of handleability.

It is preferable that the filaments ejected through the spinneret holes are collected in a position located at a distance of 500 mm to 7,000 mm from the position where the cooling is initiated. When the distance from the cooling initiation position to the position for collection is less than 500 mm, the filaments may be collected before solidification, leading to a property decrease due to fusion between single fibers and enhanced unevenness in fiber diameter due to unstable solidification points. When the filaments are not collected within 7,000 mm, filament breakage is apt to occur due to an increased spinning tension, resulting in a decrease in spinning stability.

The filaments that have been cooled and solidified are taken up by a roller (godet roller) rotating at a constant speed. The take-up speed is preferably 300 m/min or higher, more preferably 500 m/min or higher, from the standpoints of linear evenness and improvement in production efficiency. An upper limit thereof is preferably 4,000 m/min or less from the standpoint of inhibiting crystals from being formed during the high-speed spinning.

The unstretched filaments thus obtained are stretched with heating between a first roller and a second roller, either after being temporarily taken up or successively after being taken up. Specifically, the unstretched filaments are heated to a given temperature by a heated first roller or by a heating device disposed between a first roller and a second roller, and conditions are set so that the filaments are stretched in the vicinity of the heat source in accordance with the peripheral-speed ratio between the first roller and the second roller.

When the first roller is used as a heat source, a separate roller may be provided to these rollers so that the fibers are heated while running along the peripheries of the rollers at a fixed speed. In this case, from the standpoints of stabilizing the heating temperature and fixing the speed, it is preferable that the fibers make six or more laps around each roller. An upper limit of the number of laps is about 10 from the standpoint of the production efficiency of the equipment. From the standpoint of processability, it is important to set conditions so that the fibers are stretched in the vicinity of the outlet of the first roller.

When a heating device disposed between the first roller and the second roller is used as a heat source, the heating device may be of the contact type or the non-contact type. Specific usable means include hot pins, pot plates, a liquid bath, a laser, infrared rays, heated water vapor and the like. It is preferred to use a liquid bath from the standpoints of handleability and thermal efficiency. In using a liquid bath, the liquid to be used can be any desired liquid such as water, an alcohol, or an organic solvent, but water is preferred from the standpoint of handleability. From the standpoint of processability, it is important to set conditions so that the fibers are stretched in the vicinity of the inlet of the liquid bath.

The temperature of the heat source in the stretching step is preferably 70-130° C. By regulating the temperature thereof to 70° C. or higher, the processability is improved and stable stretching is rendered possible. By regulating the temperature thereof to 130° C. or lower, fluffing and filament breakage can be inhibited and fibers having excellent quality can be obtained.

The second roller may be heated or not at will. In heating the second roller, it is preferred to regulate the temperature thereof to 130° C. or lower, from the standpoint of processability. When the temperature of the second roller exceeds 130° C., there is a heightened possibility that the filaments might be stretched on the second roller, resulting in considerably reduced processability.

From the standpoint of further improving the thermal dimensional stability, it is preferable that the filaments which have passed through the second roller are heat-set by heating the filaments with a heated third roller or a group of heated third rollers or with a heating device disposed between rollers. The heating device may be of the contact type or the non-contact type, and specific usable means include hot pins, pot plates, a liquid bath, a laser, infrared rays, heated water vapor and the like.

From the standpoints of heating temperature and heating time, which will be described later, it is preferable that the heating source to be used for the heat treatment is a heated third roller or a group of heated third rollers. The heating temperature of the heating roller(s) as a means of the heat treatment is preferably 160° C. or higher, more preferably 180° C. or higher. Meanwhile, the temperature of the heating roller(s) is preferably 250° C. or lower, because temperatures thereof close to the melting point of the fibers result in fusion breakage. With respect to heating time, too short heating times do not enable the crystallization to proceed sufficiently. Consequently, the heating time is preferably 0.1 second or longer, more preferably 0.3 seconds or longer. Although there is no particular upper limit on the heating time, it is preferable that the heating time is 1,000 seconds or shorter from the standpoint of production efficiency.

The stretch ratio in the stretching with the second roller and the third roller can be regulated at will so long as fiber breakage does not occur. The stretch ratio can be set at 0.9-1.1, and is more preferably 0.9-1.0.

The total stretch ratio expressed by the ratio of the peripheral speed of the third roller(s) to the peripheral speed of the first roller is 2.0 or higher, more preferably 2.5 or higher. By regulating the total stretch ratio to 2.0 or higher, fibers having mechanical properties which enable the fibers to withstand practical use can be produced. Although there is no particular upper limit on the total stretch ratio, an attainable upper limit thereof is about 6.0.

The total stretch ratio is defined as the ratio of the peripheral speed of the last roller to the speed of feeding the unstretched fibers to be stretched, i.e., the peripheral speed of the first roller used for stretching. The last roller is the final roller which governs the speed of filaments in the stretching and heat treatment steps. Since stretching and a heat treatment are generally performed successively, the last roller is the final roller after the heat treatment. Namely, when the filaments are wound up as long fibers, the roller just before the winder is the last roller. In the case of performing crimping for short-fiber applications, the roller located after the heat treatment and before the crimping is the last roller.

A long-term heat treatment for structure stabilization is given to the PPS fibers thus obtained. The temperature is preferably 85-240° C., more preferably 130-230° C., even more preferably 180-220° C. Although the heat treatment time depends on the heat treatment temperature, at least 500 hours are necessary for attaining a degree of crystallization of 45.0% or higher at any temperature in the range of 85-240° C. For example, at a temperature of 220° C., a degree of crystallization of 45.0% or higher can be attained by performing the heat treatment for 500 hours (21 days). Since the attainable degree of crystallization does not depend on the mode or method of heat treatment, a heat treatment can be performed as an environment where bag filter products are actually used while being continuously exposed to heat of about 150-210° C.

EXAMPLES

Our fibers and methods are explained below in more detail by reference to Examples. Properties in the Examples were determined by the following methods.

A. Weight-Average Molecular Weight

The weight-average molecular weights of a PPS polymer and a PPS fiber were determined using gel permeation chromatography (GPC), which is a kind of size exclusion chromatography (SEC), through calculation for polystyrene. Measurement conditions for the GPC are shown below.

Apparatus: SSC-7100, manufactured by Senshu Scientific Co., Ltd.

Column name: GPC3506, manufactured by Senshu Scientific Co., Ltd.

Eluent: 1-chloronaphthalene

Detector: differential refractive-index detector

Column temperature: 210° C.

Pre-thermostatic chamber temperature: 250° C.

Pump thermostatic chamber temperature: 50° C.

Detector temperature: 210° C.

Flow rate: 1.0 mL/min

Sample injection amount: 300 μL (slurry; about 0.2% by weight)

B. Alkali Metal Content

The alkali metal contents in a PPS resin and a PPS fiber were determined in the following manner.

(a) A sample was weighed and placed in a quartz crucible, and was ashed using an electric furnace.

(b) The ash was dissolved in concentrated nitric acid, and the volume of the solution was adjusted to a given value with dilute nitric acid.

(c) The resultant solution having the given volume was analyzed by ICP gravimetric analysis (apparatus; 4500, manufactured by Agilent) and ICP emission spectral analysis (apparatus; Optima 4300DV, manufactured by PerkinElmer, Inc.).

C. Degree of Crystallization (Xc), Thermal Properties (Tc, ΔHc, Tm, ΔHm)

A differential scanning calorimeter (DSCQ1000, manufactured by TA Instruments) was used to conduct a differential scanning calorimetric analysis in nitrogen under the conditions of a heating rate of 10° C./min. The temperature at which an exothermic peak was observed was taken as crystallization temperature (Tc), and the crystallization heat quantity at the Tc was expressed by ΔHc (J/g). Meanwhile, the temperature which was not lower than 200° C. and at which an endothermic peak was observed was taken as melting point (Tm), and the melting heat quantity at the Tm was expressed by ΔHm (J/g). The difference between the ΔHm and the ΔHc was divided by the melting heat quantity of completely crystalline PPS (146.2 J/g) to determine the degree of crystallization Xc (%).

$$Xc=\{(\Delta Hm-\Delta Hc)/146.2\}\times 100$$

D. Content of Movable Amorphous Components (Xma), Thermal Properties (Tg, ΔCp)

Using the same apparatus as in the item C described above, a differential scanning calorimetric analysis was conducted by temperature-modulation DSC in nitrogen under the conditions of a heating rate of 2° C./min, temperature amplitude of 1° C., and temperature modulation period of 60 seconds. Additional lines were drawn from points respectively before and after the glass transition temperature (Tg) on the resultant chart to the base line, and the difference therebetween was taken as difference in specific heat ΔCp (J/g° C.). This difference in specific heat was divided by the difference in specific heat before and after the Tg of completely amorphous PPS (0.2699 J/g° C.) to determine the content of movable amorphous components Xma (%).

$$Xma=(\Delta Cp/0.2699)\times 100$$

E. Fiber Diameter

Lateral surfaces of a fiber were examined to thereby measure the diameter of the fiber with a microscope.

F. Overall Fineness, Single-Fiber Fineness

A hank of 100-m fibers was taken using a sizing reel, and the weight (g) thereof was multiplied by 100. This measurement was made three times for each level, and an average thereof was taken as the overall fineness (dtex). This overall fineness was divided by the number of filaments, and the resultant quotient was taken as the single-fiber fineness (dtex).

G. Strength, Elongation, Elastic Modulus

In accordance with the method described in JIS L1013: 2010, a measurement was conducted 10 times for each level using Tensilon UCT-100, manufactured by Orientec Co., Ltd., under the conditions of a specimen length of 200 mm and a pulling speed of 200 mm/min. Average values thereof were taken as the force (cN), strength (cN/dtex), elongation (%), and elastic modulus (cN/dtex).

H. Boiling-Water Shrinkage Ratio

In accordance with the method described in JIS L 1013, a measurement was conducted in the following manner. A specimen was allowed to stand in an atmosphere of 20° C. and 65% RH, and a hank was then taken out thereof. A load of 1/30 g/dtex was applied to the hank of filaments to measure the length of the untreated fibers. These filaments were heat-treated for 30 minutes by immersion in 98° C. hot water, and the length of the treated fibers was measured under the same load as before the treatment. An average of five values calculated using the following expression was taken as the boiling-water shrinkage ratio.

$$\{(\text{Length of untreated fibers})-(\text{length of treated fibers})\}/(\text{length of untreated fibers})\times 100$$

Reference Example 1

Production of PPS Oligomers

Into a 70-L autoclave equipped with a stirrer were introduced 8.27 kg (70.0 mol) of 47.5% sodium hydrosulfide, 2.96 kg (71.0 mol) of 96% sodium hydroxide, 11.44 kg (116 mol) of N-methyl-2-pyrrolidone (hereinafter often abbreviated to NMP), 1.72 kg (21.0 mol) of sodium acetate, and 10.5 kg of ion-exchanged water. The contents were gradually heated to about 240° C. over about 3 hours while passing nitrogen therethrough at ordinary pressure, and 14.8 kg of water and 280 g of NMP were discharged as a distillate via a rectifier. Thereafter, the reaction vessel was cooled to 160° C. During this liquid-removing operation, hydrogen sulfide was released from the system in an amount of 0.02 mol per 1 mol of the sulfur ingredient introduced.

Next, 10.3 kg (70.3 mol) of p-dichlorobenzene and 9.00 kg (91.0 mol) of NMP were added, and the reaction vessel closed in a nitrogen gas atmosphere. While stirring the contents at 240 rpm, the contents were heated to 270° C. at a rate of 0.6° C./min and held at this temperature for 140 minutes. The contents were cooled to 250° C. at a rate of 1.3° C./min, while forcing 1.26 kg (70 mol) of water into the reaction vessel over 15 minutes. Thereafter, the contents were cooled to 220° C. at a rate of 0.4° C./min and then rapidly cooled to about room temperature, thereby obtaining a slurry (A). This slurry (A) was diluted with 26.3 kg of NMP to obtain a slurry (B).

A 1,000-g portion of the slurry (B) heated at 80° C. was filtered with a sieve (80 mesh; opening size, 0.175 mm) to obtain a crude PPS resin and about 750 g of a slurry (C). The slurry (C) was introduced into a rotary evaporator and, after nitrogen replacement, treated at 100-160° C. for 1.5 hours at a reduced pressure. Thereafter, the residue was treated with a vacuum dryer at 160° C. for 1 hour. The content of NMP in the solid obtained was 3% by weight.

To this solid was added 900 g (1.2 times the amount of the slurry (C)) of ion-exchanged water. Thereafter, the mixture was stirred at 70° C. for 30 minutes to obtain a slurry again. This slurry was suction-filtered with a glass filter having an opening size of 10-16 μm. To the resultant white cake was added 900 g of ion-exchanged water. This mixture was stirred at 70° C. for 30 minutes to obtain a slurry again. This slurry was suction-filtered in the same manner, and the resultant cake was vacuum-dried at 70° C. for 5 hours to obtain a PPS oligomer.

A 4-g portion was taken out from the PPS oligomer obtained, and subjected to 3-hour Soxhlet extraction with 120 g of chloroform. The chloroform was distilled off from the resultant extract. Twenty grams of chloroform was added again to the solid obtained, and the solid dissolved at room temperature to obtain a slurry mixture. This slurry mixture was gradually added dropwise to 250 g of methanol with stirring, and the resultant sediment taken out by suction filtration with a glass filter having an opening size of 10-16 μm. The white cake obtained was vacuum-dried at 70° C. for 3 hours to obtain a white powder.

This white powder had a weight-average molecular weight of 900. The white powder was burned with an electric furnace or the like and the residual ash analyzed by ion chromatography. As a result, the Na content and the chlorine content were found to be 4 ppm and 2.0% by weight, respectively, and the content of any alkali metal other than Na and the content of any halogen other than chlorine were below the detection limit. An absorption spectrum obtained by infrared spectroscopic analysis of the white powder revealed that the white powder was PPS. Moreover, a differential scanning calorimeter was used to analyze the thermal properties of the white powder. As a result (heating rate, 40° C./min), we found that the white powder showed a broad endothermic peak at about 200-260° C. and the peak temperature was about 215° C.

Furthermore, from the results of mass spectral analysis of components obtained by fractionation by high performance liquid chromatography and from information on molecular weight from MALDI-TOF-MS, the white powder was found to be a mixture containing cyclic PPS in which the number of repeating units was 4-11 and linear PPS in which the number of repeating units was 2-11, the weight ratio of the cyclic PPS to the linear PPS being about 9:1. Thus, the white powder obtained was found to be PPS oligomers including about 90% by weight of the cyclic PPS and about 10% by weight of the linear PPS.

Reference Example 2

Production of PPS Resin (A)

The PPS oligomers obtained in Reference Example 1, which included cyclic PPS, were introduced into an autoclave equipped a stirrer. The atmosphere was replaced with nitrogen, and the autoclave was heated to 340° C. over 1 hour. At the time when the PPS oligomers had melted during the temperature rising, the stirrer was started, and the melting and heating was performed for 180 minutes while stirring the contents at a stirrer rotation speed of 10 rpm. Thereafter, a resin was taken out, in the shape of a gut, by nitrogen pressure through the discharge hole, and the gut was pelletized. The solid thus obtained was dried with 130° C. hot air to obtain a dried PPS resin (A).

Reference Example 3

Production of PPS Resin (B)

About 50 L of NMP was added to 20 kg of the crude PPS resin obtained in Reference Example 1, and the crude PPS resin was washed at 85° C. for 30 minutes and taken out by filtration with a sieve (80 mesh; opening size, 0.175 mm). The solid obtained was diluted with 50 L of ion-exchanged water and the resultant mixture was stirred at 70° C. for 30 minutes and then filtered with a 80-mesh sieve to recover the solid; this operation was repeatedly performed five times in total. The solid thus obtained was dried with 130° C. hot air to obtain a dried PPS resin (B).

Example 1

The PPS resin (A) obtained in Reference Example 2 was used and vacuum-dried at 150° C. for 10 hours. Thereafter, the resin was melt-extruded with a twin-screw extruder KZW, manufactured by TECHNOVEL Corp., and the resultant resin was fed to a spinning pack while being metered with a gear pump. In the spinning pack, the polymer was filtered with a metallic nonwoven fabric filter. The polymer filtered was ejected from a spinneret having 36 holes having a diameter D of 0.23 mm and a land length L of 0.30 mm, under the conditions of 18 g/min. The introduction hole located right above each spinneret hole was a straight hole, and the joint between the introduction hole and the spinneret hole was tapered. The polymer ejected was passed through a 40-mm heat insulation zone and then solidified by cooling from outside the filaments with a 25° C. air stream. Thereafter, a spinning oil including a fatty acid ester compound as a main component was applied thereto, and all the filaments were taken up by a first godet roll at a spinning speed of 600 m/min. These filaments were wound up with a winder via a second godet roll having the same speed as the first godet roll. Thus, unstretched filaments were obtained.

The unstretched filaments were taken up by a feed roller equipped with nip rollers, and a tension was applied to the unstretched filaments between the feed roller and a first roller. Thereafter, the filaments were made to make six laps around each of the first roller heated at 100° C. and a second roller heated at 110° C., thereby stretching the filaments in a stretch ratio of 3.8. The filaments which had passed through the second roller were made to make six laps around a third roller heated at 230° C., thereby performing heat setting. The third roller had a peripheral speed of 400 m/min, and the peripheral-speed ratio of the third roller to the second roller was 0.95. The fibers which had passed through the third roller were taken up by a non-heated roller having the same speed as the third roller and wound up with a winder.

No filament breakage occurred in each step, and the fibers showed satisfactory processability. The mechanical properties and fiber diameter evenness of the fibers obtained were also satisfactory.

A hank of the fibers obtained was taken by making the fibers make 15 laps each having a length of 1.125 m. The hank was folded and placed in a beaker. This beaker was kept at 220° C. in a thermostatic chamber (PHH-201) manufactured by espec Corp., thereby performing a heat treatment for 21 days.

The fiber properties of the fibers obtained are shown in Table 1. The fibers have a weight-average molecular weight of 300,000 or less, a degree of crystallization of 45.0% or higher, and a content of movable amorphous components of 15% or less. It is hence presumed that at high temperatures, the fibers change little in structure and decrease little in strength.

Example 2

Spinning, stretching, and heat treatment were conducted in the same manners as in Example 1, except that the heat treatment time was changed to 42 days.

The fiber properties of the fibers obtained are shown in Table 1. Although the treatment was conducted over a longer period than in Example 1, the weight-average molecular weight has not increased. The fibers have a weight-average molecular weight of 300,000 or less, a degree of crystallization of 45.0% or higher, and a content of movable amorphous components of 15% or less. It is hence presumed that at high temperatures, the fibers change little in structure and decrease little in strength.

Comparative Example 1

Spinning and stretching were conducted in the same manners as in Example 1, except that the heat treatment was omitted.

The fiber properties of the fibers obtained are shown in Table 1. Since no heat treatment was performed, the fibers have a degree of crystallization less than 45.0% and a content of movable amorphous components exceeding 15%. It is hence presumed that during long-term use at high temperatures, the fibers considerably increase in the degree of crystallization and considerably decrease in strength.

Comparative Example 2

Spinning, stretching, and heat treatment were conducted in the same manners as in Example 1, except that the heat treatment time was changed to 1 day.

The fiber properties of the fibers obtained are shown in Table 1. Since the heat treatment time was insufficient, the fibers have a degree of crystallization less than 45.0% and a content of movable amorphous components exceeding 15%. It is hence presumed that during long-term use at high temperatures, the fibers considerably increase in the degree of crystallization and considerably decrease in strength.

Comparative Example 3

Spinning and stretching were conducted in the same manners as in Example 1, except that the PPS resin (B) obtained in Reference Example 3 was used and the heat treatment was omitted.

The fiber properties of the fibers obtained are shown in Table 1. Since no heat treatment was performed, the fibers have a degree of crystallization less than 45.0% and a content of movable amorphous components exceeding 15%. It is hence presumed that during long-term use at high temperatures, the fibers considerably increase in the degree of crystallization and considerably decrease in strength.

Comparative Example 4

Spinning, stretching, and heat treatment were conducted in the same manners as in Example 1, except that the PPS resin (B) obtained in Reference Example 3 was used and the heat treatment time was changed to 1 day.

The fiber properties of the fibers obtained are shown in Table 1. Since the heat treatment time was insufficient, the fibers have a degree of crystallization less than 45.0% and a content of movable amorphous components exceeding 15%. It is hence presumed that during long-term use at high temperatures, the fibers considerably increase in the degree of crystallization and considerably decrease in strength.

Comparative Example 5

Spinning, stretching, and heat treatment were conducted in the same manners as in Example 1, except that the PPS resin (B) obtained in Reference Example 3 was used.

The fiber properties of the fibers obtained are shown in Table 1. It can be seen that as a result of the heat treatment, the degree of crystallization has become 45.0% or higher and the content of movable amorphous components has become 15% or less, but the weight-average molecular weight has become higher than 300,000. It is presumed that the fibers suffer a considerable decrease in strength due to crosslinked components.

TABLE 1

|  |  | Unit | Example 1 | Example 2 | Comparative Example 1 | Comparative Example 2 | Comparative Example 3 | Comparative Example 4 | Comparative Example 5 |
|---|---|---|---|---|---|---|---|---|---|
| Production method | Heat treatment temperature | ° C. | 220 | 220 | 220 | 220 | 220 | 220 | 220 |
|  | Heat treatment time | day | 21 | 42 | 0 | 1 | 0 | 1 | 21 |
| Fiber properties | Weight-average molecular weight (Mw) | — | 69,000 | 66,000 | 50,000 | 56,000 | 47,000 | 50,000 | 320,000 |
|  | Degree of crystallization (Xc) | % | 48.6 | 49.9 | 36.6 | 41.3 | 35.6 | 42.2 | 45.9 |
|  | Content of movable amorphous components (Xma) | % | 9.4 | 7.3 | 20.6 | 20.3 | 20.5 | 16.3 | 13.8 |

TABLE 1-continued

|  | Unit | Example 1 | Example 2 | Comparative Example 1 | Comparative Example 2 | Comparative Example 3 | Comparative Example 4 | Comparative Example 5 |
|---|---|---|---|---|---|---|---|---|
| Melting point(Tm) | °C. | 282.2 | 282.9 | 285.2 | 284.6 | 286.8 | 285.0 | 279.2 |
| Difference between melting heat quantity and crystallization heat quantity ($\Delta Hm - \Delta Hc$) | J/g | 71.1 | 73.0 | 53.5 | 60.4 | 52.0 | 61.7 | 67.1 |
| Glass transition temperature (Tg) | °C. | 136.1 | 138.1 | 129.1 | 134.6 | 131.2 | 136.7 | 139.6 |
| Difference in specific heat ($\Delta Cp$) | J/g°C. | 0.0255 | 0.0198 | 0.0556 | 0.0547 | 0.0554 | 0.0440 | 0.0372 |
| Content of alkali metal (Na) | ppm | 8 | 8 | 8 | 8 | 1030 | 1030 | 1030 |
| Fiber diameter | μm | 15.0 | 15.0 | 14.5 | 15.0 | 15.0 | 15.2 | 15.2 |
| Single-fiber fineness | dtex | 2.4 | 2.4 | 2.2 | 2.4 | 2.3 | 2.5 | 2.5 |
| Elongation | % | 21.6 | 19.0 | 26.2 | 29.0 | 25.3 | 32.0 | 26.0 |
| Strength | cN/dtex | 3.0 | 2.9 | 4.0 | 3.7 | 4.1 | 3.9 | 3.2 |
| Elastic modulus | cN/dtex | 53.7 | 55.2 | 49.0 | 50.0 | 48.2 | 46.1 | 45.4 |
| Boiling-water shrinkage ratio at 98° C. | % | 0.0 | 0.0 | 1.5 | 0.1 | 1.8 | 0.1 | 0.0 |

The invention claimed is:

1. A poly(phenylene sulfide) fiber having a degree of crystallization of 45.0% or higher, a content of movable amorphous components of 15.0% or less, and a weight-average molecular weight of 300,000 or less.

2. The poly(phenylene sulfide) fiber according to claim 1, having a fiber diameter of 5.0 μm or larger.

3. The poly(phenylene sulfide) fiber according to claim 1, having a boiling-water shrinkage ratio at 98° C. of 1.0% or less.

4. The poly(phenylene sulfide) fiber according to claim 2, having a boiling-water shrinkage ratio at 98° C. of 1.0% or less.

* * * * *